United States Patent
Brand et al.

(10) Patent No.: US 11,814,162 B2
(45) Date of Patent: Nov. 14, 2023

(54) ROTATABLE WINGLETS FOR A ROTARY WING AIRCRAFT

(71) Applicant: Bell Textron Inc., Fort Worth, TX (US)

(72) Inventors: Albert G. Brand, N. Richland Hills, TX (US); Michael S. Seifert, Southlake, TX (US); Andrew Thomas Carter, Richland Hills, TX (US); Aaron Alexander Acee, Flower Mound, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 124 days.

(21) Appl. No.: 16/905,558

(22) Filed: Jun. 18, 2020

(65) Prior Publication Data
US 2021/0394894 A1    Dec. 23, 2021

(51) Int. Cl.
*B64C 27/26* (2006.01)
*B64C 27/04* (2006.01)
*B64C 3/38* (2006.01)
*B64C 27/82* (2006.01)

(52) U.S. Cl.
CPC .............. *B64C 27/26* (2013.01); *B64C 3/385* (2013.01); *B64C 27/04* (2013.01); *B64C 27/82* (2013.01)

(58) Field of Classification Search
CPC ............ B64C 27/26; B64C 9/30; B64C 3/385
See application file for complete search history.

(56) References Cited

U.S. PATENT DOCUMENTS

| | | | | |
|---|---|---|---|---|
| 5,280,863 | A * | 1/1994 | Schmittle | B64C 29/02 244/46 |
| 5,395,073 | A * | 3/1995 | Rutan | B64C 29/0033 244/38 |
| 9,428,269 | B1 * | 8/2016 | Oppenheimer | B64C 33/02 |
| 2017/0021911 | A1 * | 1/2017 | Wildschek | B64C 3/42 |
| 2019/0084684 | A1 * | 3/2019 | Eller | B64D 27/24 |
| 2020/0086971 | A1 * | 3/2020 | Heeringa | B64C 5/08 |
| 2022/0153403 | A1 * | 5/2022 | Bomphrey | B64C 3/42 |

FOREIGN PATENT DOCUMENTS

DE   3935925 C2 *   2/1993   ............. B64C 13/16

OTHER PUBLICATIONS

Vertiflite, "US Military Programs Review," a publication of the Vertical Flight Society, Mar./Apr. 2020, 3 pages.

* cited by examiner

*Primary Examiner* — Tien Q Dinh
*Assistant Examiner* — William L Gmoser
(74) *Attorney, Agent, or Firm* — Akona IP

(57) ABSTRACT

One embodiment includes a rotary aircraft, including: a main drive rotor; an aircraft body mechanically coupled to the main drive rotor; and first and second flight assist wings passively rotatably coupled to the aircraft body.

20 Claims, 7 Drawing Sheets

ROTATABLE WINGLETS FOR A ROTARY WING AIRCRAFT

TECHNICAL FIELD

This disclosure relates generally to aeronautical engineering, and more particularly, though not exclusively, to a system and method for providing rotatable winglets for a rotary wing aircraft.

BACKGROUND

Rotary wing aircraft may be used to perform a variety of tasks requiring a high degree of functional flexibility.

SUMMARY

In an example, there is disclosed a rotary aircraft, comprising: a main drive rotor; an aircraft body mechanically coupled to the main drive rotor; and first and second flight assist wings passively rotatably coupled to the aircraft body.

DETAILED DESCRIPTION

Rotary wing aircraft are often called upon to perform multiple functions. For example, in some cases the aircraft are required to lift heavy objects and either hover in place or move at a relatively low rate of speed. On the other hand, they may also be called upon at times to move at a relatively higher rate of speed, particularly when they are not lifting an object, or otherwise engaged in stationary flight operations.

One example of a rotary wing aircraft that may be called upon to perform multiple functions is a military helicopter, such as an attack helicopter. An attack helicopter may be required at times to hover while loitering over a battlefield or providing close air support, and at other times may be required to move at a relatively high rate of speed to respond to a call for close air support.

When a rotary wing aircraft is called upon to move at a relatively higher rate of speed, it is beneficial for that aircraft to have wings that offload the rotor. In forward motion, wings reduce the power required, and increase the helicopter's maximum speed. While wings are indeed beneficial for forward flight, they can inhibit stationary flight operations. When a helicopter is hovering, fixed wings sit in the wash of the rotor, and contribute to a download force on the helicopter. This download force effectively cancels a portion of the helicopter's airlift capability. For example, a download force of 100 kg effectively reduces the airlift capacity of a helicopter by 100 kg.

In an illustrative example, an attack helicopter having fixed wings may experience an additional download force that reduces the vertical-lift cargo capacity of the helicopter by approximately 400 to 500 pounds. However, to meet speed requirements of at least 180 knots (kts) with the available power, the attack helicopter needs the assistance of wings that provide aerodynamic lift. Nevertheless, the loss of 400 to 500 pounds of vertical airlift capacity may also be unacceptable because it may be necessary for the attack helicopter to carry munitions and other armaments.

Figure 3:
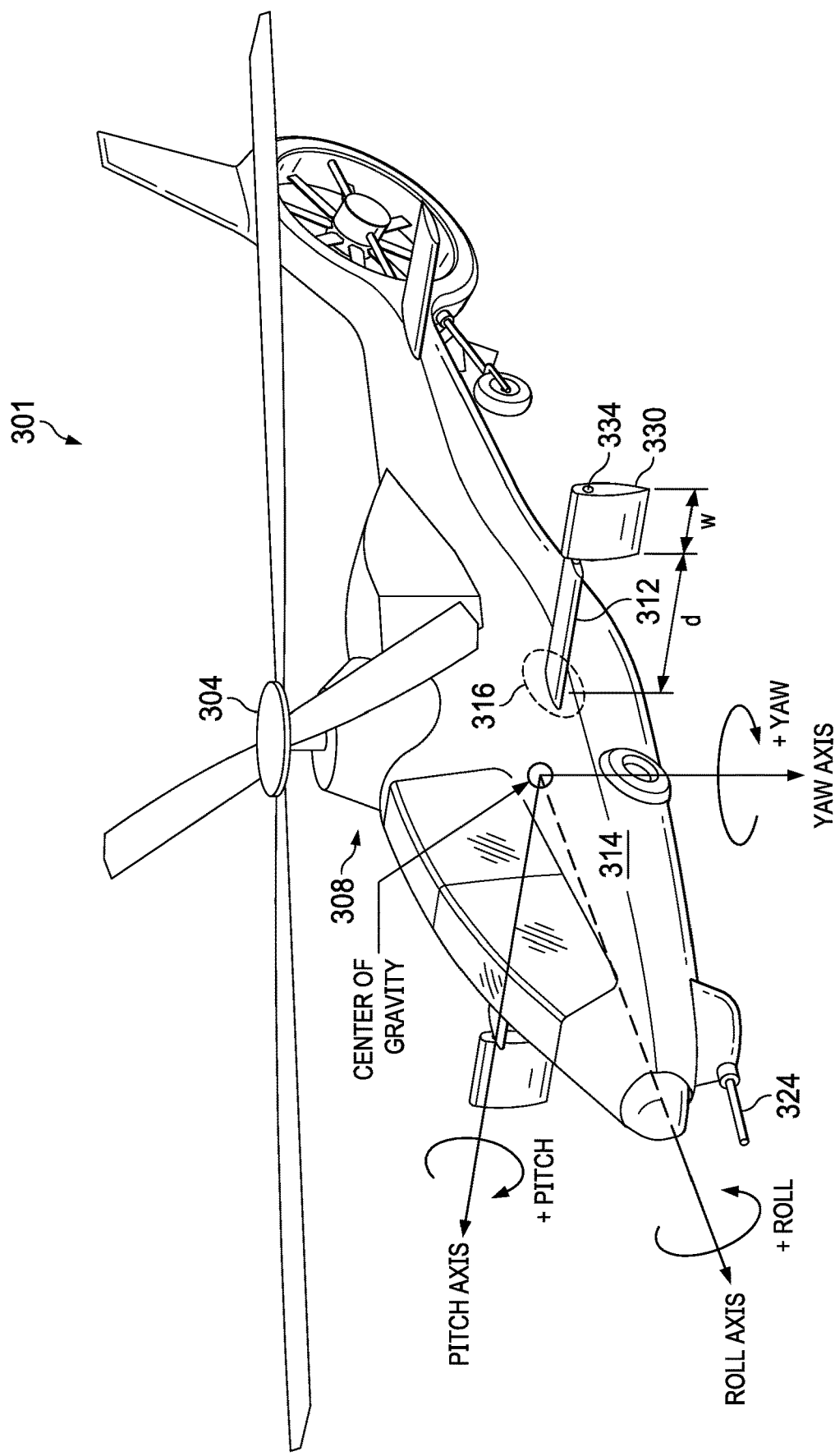
FIG. 3 illustrates a perspective view of an example rotary wing aircraft.

There is disclosed herein a rotary aircraft having flight assist wings that provide beneficial aerodynamic lift in high-speed flight scenarios. These flight assist wings may be full-sized wings, or alternatively, they may be "winglets" sitting on the end of pylons that are statically or rotatably affixed to the body of the aircraft. Referring to FIG. 3, wing pylons 312 reside close to the fuselage where the rotor downwash is generally less, and may experience substantially less download force. If the pylons also have lesser aerodynamic surface area than the winglet, they will further contribute to less download in hover. Winglets 330 may have a substantially larger aerodynamic surface area than the pylons and offer greater aerodynamic benefit than they would if they were located closer in to the body of the aircraft. If the rotary aircraft is a military aircraft such as an attack helicopter, the pylons may also provide hard mount points for weapons.

The winglets may be actively or passively biased, including via gravitational biasing, to move the trailing edge downward. Gravitational biasing simply means that the center of gravity of the winglets is such that a majority of the wing's mass is behind the pivot point, so that when the aircraft is stationary, the winglets simply rotate with the trailing edge downward due to gravitational torque on the winglet. When the aircraft moves forward, particularly at a high rate of speed, the aerodynamic lift incident on the winglets begins to rotate them upward. Upstops and downstops may provide a maximum rotational displacement for the winglets. When the winglets hit the upstop or downstop, additional force does not rotate them further, but simply increases the force against the upstop or downstop.

Embodiments of the rotary aircraft described herein include winglets that are passively rotatably affixed to the aircraft body or to a wing pylon. These could be "freefloating" winglets displaced according to gravitational and aerodynamic forces, or there could be other mechanical biasing means, such as a spring that biases the winglets into a vertical position and is stiff enough to only allow rotation toward horizontal in the presence of sufficient aerodynamic forces, according to design considerations of the particular embodiment. In other embodiments, there may be active control means, including a sensor to sense airspeed or aerodynamic forces on the winglet, and a feedback control system that actively displaces the winglet, according to the sensed airspeed or aerodynamic forces. While active control mechanisms are more complex and require more maintenance and cost, they do have the advantage of providing more controlled rotational displacement of the winglets.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
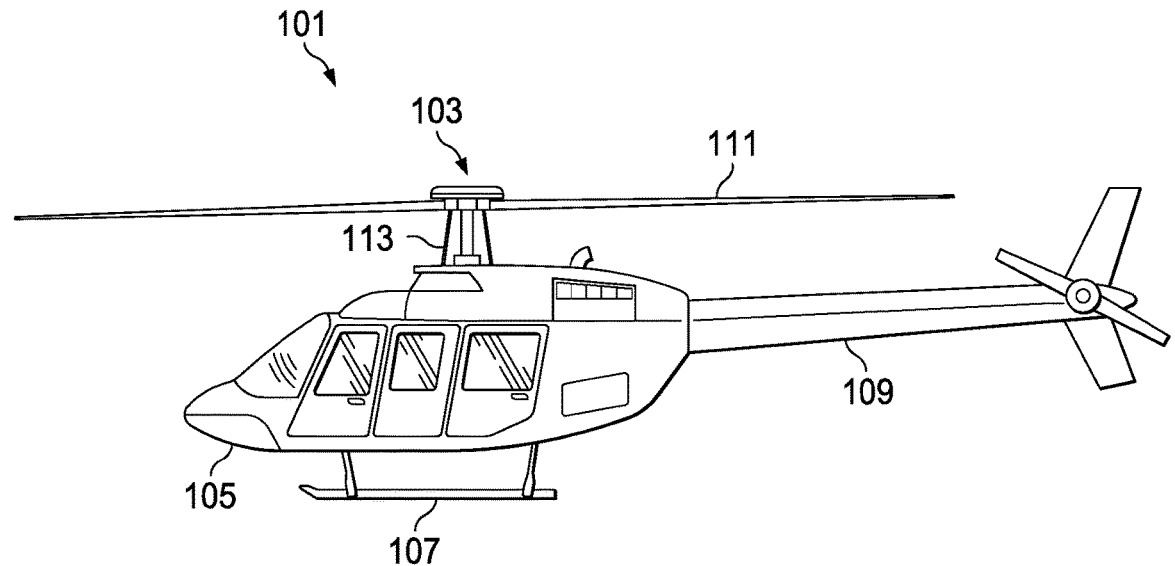
FIG. 1 illustrates an example embodiment of a rotorcraft.

FIG. 1 illustrates an example embodiment of a rotorcraft 101. Rotary aircraft 101 could be either a manned or an unmanned rotary aircraft. In some cases, rotary aircraft 101 could be electrically powered instead of powered by jet fuel. In those cases, rotary aircraft 101 could either be designed from the start with an in-air recharging system, or it could be modified after production with an aftermarket in-air recharging system.

In cases where rotary aircraft 101 is powered by jet fuel, it could be modified to serve as a tanker for in-air recharging of electrical aircraft such as electrically powered drones. For example, rotary aircraft 101 could include a generator that converts its jet fuel power into electrical power, and that electrical power could be shared with electrical aircraft such as drones.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer. Rotor blades are attached to a drive shaft 113. Also visible in this figure are landing skids 107.

Figure 2:
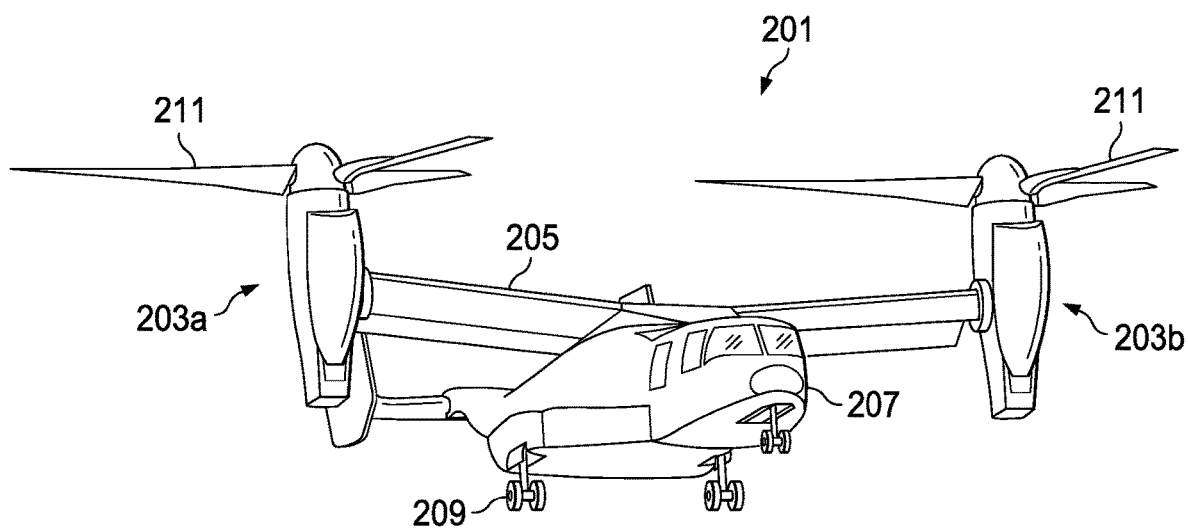
FIG. 2 illustrates a perspective view of an example tiltrotor aircraft.

FIG. 2 illustrates a perspective view of an example tiltrotor aircraft 201. Tiltrotor aircraft 201 could be either a manned or an unmanned rotary aircraft. In some cases, tiltrotor aircraft 201 could be electrically powered instead of powered by jet fuel. In those cases, tiltrotor aircraft 201 could either be designed from the start with an in-air recharging system, or it could be modified after production with an aftermarket in-air recharging system.

In cases where tiltrotor aircraft 201 is powered by jet fuel, it could be modified to serve as a tanker for in-air recharging of electrical aircraft such as electrically powered drones. For example, tiltrotor aircraft 201 could include a generator that converts its jet fuel power into electrical power, and that electrical power could be shared with electrical aircraft such as drones.

Tiltrotor aircraft 201 includes nacelles 203a and 203b, a wing 205, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed-wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, tiltrotor aircraft 201 may be an autonomous drone vehicle, or a remote-controlled drone vehicle, in which case some control functions are provided by a computer. Also visible in this figure are landing wheels 209.

FIG. 3 illustrates a perspective view of an example rotary wing aircraft 301. In this example, rotary wing aircraft 301 is illustrated as an attack helicopter. Attack helicopter 301 includes a main rotor 304, mechanically coupled to an airframe 308 of the attack helicopter. Airframe 308 provides a structural body of attack helicopter 301, and also provides mount points. For example, wing pylons 312 are affixed to body 314 at mount points 316. Body 314 also provides mount points for various armaments, such as armament 324, which is illustrated as a main gun, commonly used for close air support missions. Although other armaments are not illustrated in this FIGURE for the sake of simplicity, many other armaments are possible for an attack helicopter, including weapons mounted on fixed wing pylon 312.

Wing pylons 312 may be statically affixed to body 314 at mount points 316. This means that wing pylons 312 do not rotate, and may effectively be considered part of body 314 of attack helicopter 301. In this configuration, a through rod may pass through both fixed wing pylons 312, and engage winglets 330 at pivot points 334, whereby winglets 330 are rotatably mounted to wing pylons 312.

Alternatively, wing pylons 312 may themselves constitute the supporting mechanism for the through rod that passes through pivot points 334 of winglets 330. In that configuration, both winglets 330 may be statically affixed to a single wing pylon through-rod 312, while single wing pylon 312 rotatably engages body 314. In that case, a bearing or bearings may be used at mount points 316 to aid rotation of wing pylon 312.

Winglets 330 are rotatably or fixedly mounted to wing pylons 312 at pivot points 334. Pylon-mounted winglets are provided herein as an illustrative embodiment, and provide some advantages. For example, the fixed pylon can serve as a rigid mount for weapons. In the embodiment of FIG. 3, the winglets 330 are rotatably mounted on fixed wing pylons 312 so that an inboard portion of the winged area can be used for weapons deployment. The outer (rotating winglet) pivots with the local airstream so that it does not experience download forces in hover. As the helicopter moves to forward flight the winglet 330 rotates freely about pivot 334 until a certain position is reached. At this position, further rotation is prevented and the winglet begins to develop increasing lift as the airspeed increases.

In some embodiments, the winglet pitching moment could exceed the available aerodynamic torque on winglet 330, even at higher airspeeds, such as in the case of a very heavy or poorly designed winglet. Thus, it would be more difficult to provide the dual benefits of a rotating winglet that rotates vertical for stationary flight, and pivots horizontal for high airspeeds. The present specification anticipates embodiments in which the winglet is properly balanced, including one that forms a full wing with a rotational action very near the aircraft body. However, in such an embodiment, it may not be practical to put hard mount points (e.g., for weapons) on the winglet. Thus, such an embodiment is even more suitable for a civilian rotorcraft.

Advantageously, with winglets 330 mounted to wing pylons 312, rotatable winglets 330 can be smaller and weigh less than a full-span rotatable wing would weigh, and there can be provision for mount points on the pylons. For example, in an illustrative embodiment, the span (w) of the winglets 330 is less than the distance (d) from which winglets 330 are removed from body 314 by wing pylons 312.

When attack helicopter 301 is in stationary flight, main rotor 304 produces an essentially vertical thrust force. Depending on how the winglet is mass-balanced, gravitational torque can be used to rotate winglet 330 in the same direction as the downwash of the main rotor 304. In another embodiment, in the absence of downwash, the winglet may be biased (by nose weight placement) to remain horizontal solely by gravitational torque. This embodiment may be preferable if a horizontal winglet position is desired while the aircraft is parked. In that case, aerodynamic torque induced by rotor wash forces may rotate winglets 330 to their downward position once the rotor produces thrust. In yet other embodiments, biasing means such as a spring or similar device may be used to bias the winglets toward a desired direction/position in the absence of other aerodynamic forces. The direction of the biasing (e.g., upward or downward) may depend on the desired placement of the wings when the rotorcraft is parked or stationary.

It is not necessary to provide active or mechanical control to bias winglet 330 toward a vertical position. However, if called for in a particular embodiment, such mechanical or active biasing means could be provided to further bias winglet 330 down toward a vertical position. For example, a spring or other mechanical biasing means could be provided to bias winglet 330 downward. In an alternative embodiment, winglets 330 may be biased upward, so that they rotate downward (due to weathervane action) only in the presence of rotor wash.

Furthermore, it may be desirable to avoid rapid rotations or flutter in winglet 330. To reduce flutter, a damper may be provided to reduce transient displacements of winglet 330 in either direction. In some cases, the damper may be provided inside of body 314 of attack helicopter 301. For example, a single rotatable through rod fixed to the winglet at point 334 could pass through both winglets 330, wing pylons 312, and aircraft body 314. Not only does this have the advantage of being a simple configuration with fewer moving parts, but it also means that winglets 330 move jointly. Thus, they always have the same displacement, and therefore provide uniform angle of incidence change in forward flight. Because of the rotorcraft's asymmetry, there is no guarantee that winglets 330 will provide symmetric lift, even when they have the same angle of incidence. In the case of a single through rod, a single damper, such as a single dashpot, could be used to reduce flutter or other transient motion of winglets 330. The dashpot could be either a linear or a rotary dashpot.

Other damping means may be used. In certain embodiments, it may be desirable to have separate through rods for each winglet so that the winglets can respond independently, such as during a maneuver with high roll rate.

In another embodiment, it may be desirable to inhibit rotation of the winglet once the winglet has been displaced to a certain position. For example, in the presence of aerodynamic forces during hover, the winglet is designed to weathervane (rotate with the rotor wash to a vertical orientation) so that the rotor downwash does not produce down force on the winglet. As the helicopter moves from hover to forward flight, the aerodynamic force from the combined rotor wash and the approaching free stream continues to cause the winglet to weathervane, now rotating the winglet trailing edge up. In an illustrative embodiment, as forward speed continues to increase, the winglet's rotation reaches a maximum amount and comes against a mechanical stop that prevents further weathervane action. From here, further increases in forward speed result in the winglet being at a fixed incidence and at an effective angle of attack so that the winglet produces lift.

There is further disclosed a means to improve the autorotational capability of the winged helicopter by removing the winglet's nose down stop, thereby allowing the wing to pivot nose down so that the wing lift is eliminated and the main rotor is forced to carry all of the aircraft weight. The increased rotor thrust resulting in increased force available to rotate the main rotor during the descent.

In another embodiment, biasing means such as a spring or similar may bias the winglets towards a vertical position, so that in the event of an autorotation, where rotor wash forces are not as strong, the winglets move downward anyway. This may improve autorotation performance by ensuring that the winglets do not substantially inhibit the autorotation action. In another embodiment, an autorotation sensor could detect an autorotation event, and actively bias the winglets toward vertical (e.g., using an electromechanical motor) and keep them in the vertical position for the duration of the autorotation. Although this method expends some power during an event that is inherently an emergency procedure, in which aircraft power may be at a premium, this may be a desirable tradeoff to ensure that the winglets do not inhibit autorotation.

FIGS. 4-13 illustrate an example winglet in operation.

Figure 4:
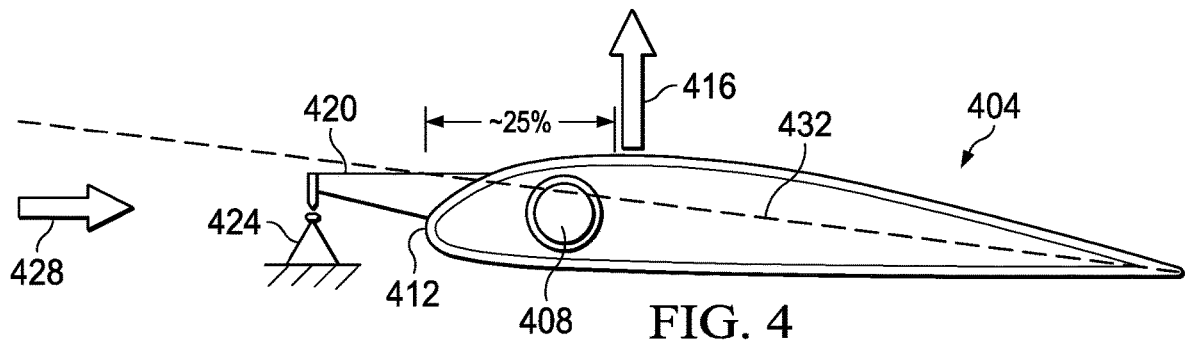
FIG. 4 illustrates a winglet in the presence of an oncoming flow.

FIG. 4 illustrates a winglet 404 in the presence of an oncoming flow 428. The winglet's associated lift 416 is centered at the airfoil's 25% chord position, as is typical for many airfoils. For a given speed of oncoming flow 428, the lift 416 of the winglet 404 is determined by the angle between the oncoming flow 428 and the winglet's zero lift line 432. In this embodiment, winglet pivot 408 is selected at an appropriate point forward of the winglet's 25% chord, such that the lift force causes a counterclockwise moment about winglet pivot 408.

Figure 5:
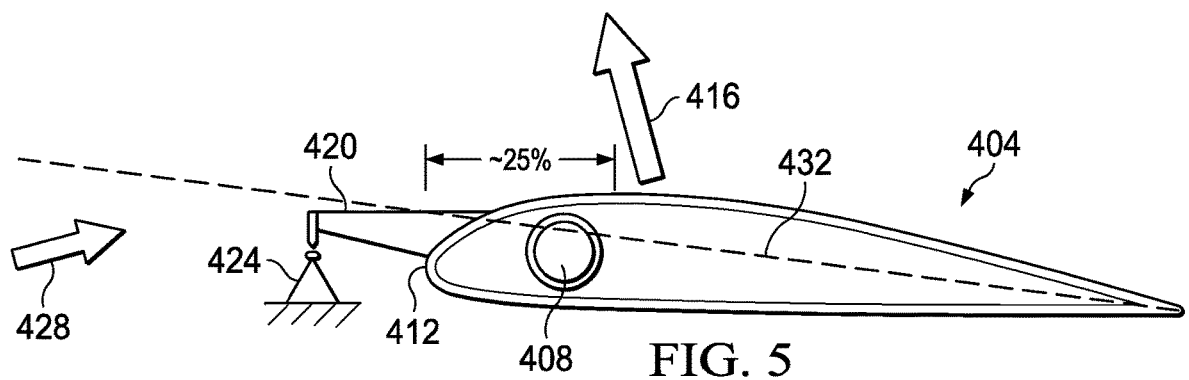
FIG. 5 illustrates an embodiment in which flow direction is at a higher angle of attack with respect to a winglet's zero lift line.

As illustrated in FIGS. 4-5, the counterclockwise moment due to lift 416 acting about winglet pivot 408 is reacted by the winglet's extension arm 420 that rests upon restraint 424. If, as in FIG. 5, the direction of oncoming flow 428 changes to a higher angle of attack with respect to the winglet's zero lift line 432, the winglet's lift 416 increases and remains perpendicular to the oncoming flow 428. The increased counterclockwise moment due to lift 416 about the pivot 408 is reacted by extension arm 420 against restraint 424, and winglet 404 remains fixed.

Figure 6:
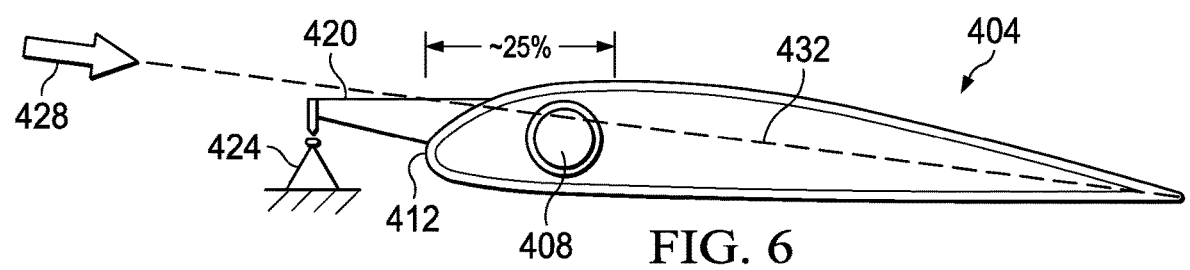
FIG. 6 illustrates an embodiment in which flow direction is coincident with a winglet's zero lift line.

In FIG. 6, the direction of oncoming flow 428 has changed such that it is coincident with the winglet's zero lift line, thereby neutralizing the wing's lift. In this condition, there is no counterclockwise moment due to lift. Extension arm 420 applies no force against restraint 424 and winglet 404 remains in equilibrium at the position shown.

Figure 7:
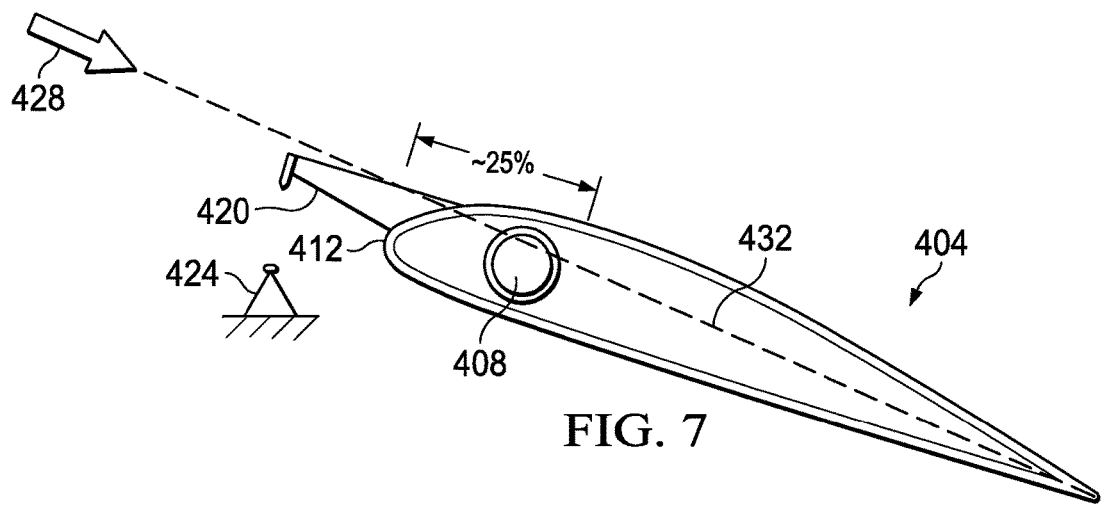
FIG. 7 illustrates an embodiment in which flow direction causes a winglet to freely pivot like a weathervane.

In FIG. 7, the direction of oncoming flow 428 changes so as to cause the winglet to freely pivot about 408 like a weathervane. FIG. 7 can represent a helicopter in a forward flight climb condition. If the wing 404 were prevented from freely pivoting it would remain horizontal, causing it to operate a negative angle of attack, producing significant downforce that the main rotor would need to overcome. The freely pivoted position of winglet 404 is with the onset flow parallel to the winglet's zero lift line 432, where the aerodynamic force and moments are neutral and winglet 412 is in equilibrium. Taken together, FIGS. 4-7 illustrate a purpose of the winglet, which is to serve as a supplemental lift device for a helicopter in cruise (FIGS. 4-5), while not being detrimental to low speed climb performance (FIG. 7).

Figure 8:
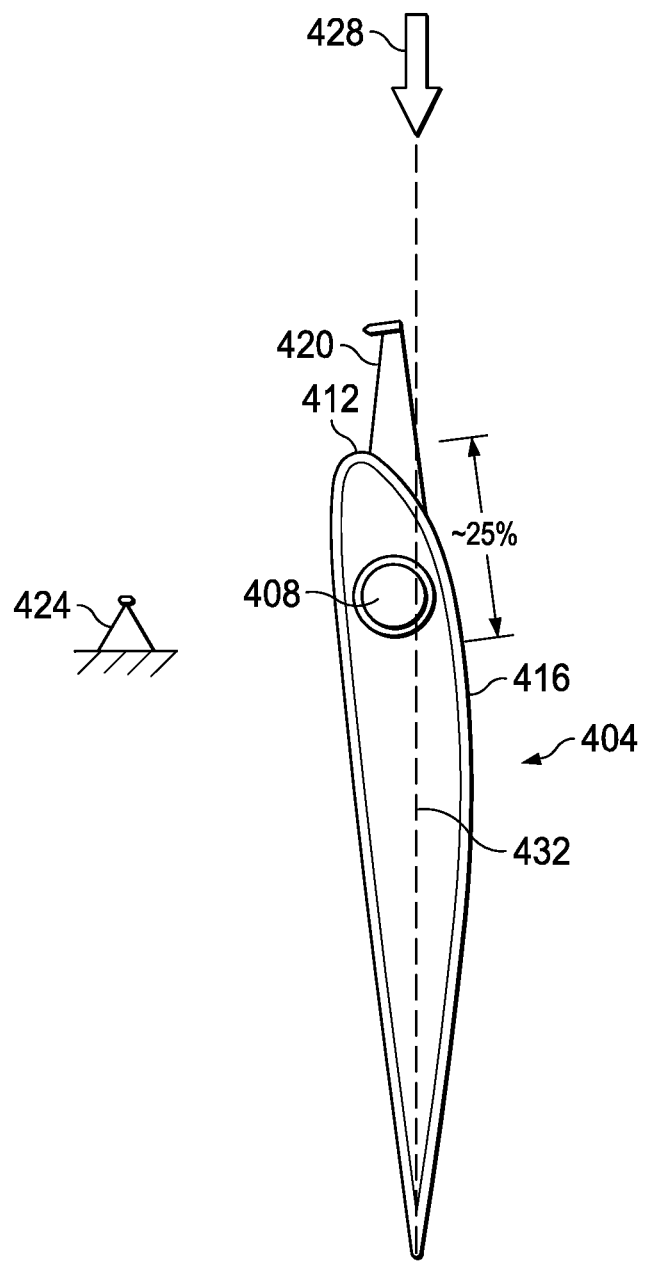
FIG. 8 illustrates a vertical onset flow representing the downwash of a hovering helicopter.

As shown in FIG. 8, vertical onset flow 428 represents the downwash of a hovering helicopter. In FIG. 8, the winglet 412 has freely rotated (weathervaned) into oncoming rotor wash 428 and does not develop any lift force (lift being defined as the force perpendicular to the onset velocity). With the ability to freely pivot, the wing does not develop a downward force, so its effect on the helicopter's payload capacity is minimized.

Figure 9:
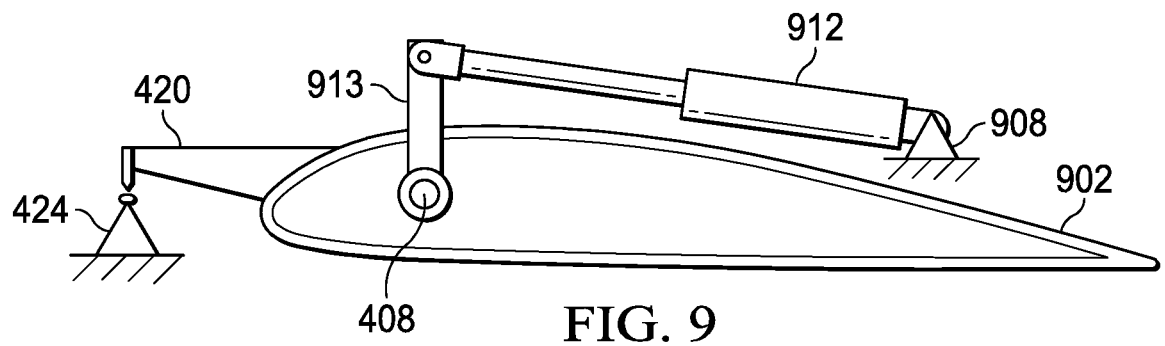
FIGS. 9 and 10 illustrate a damping mechanism that provides high stiffness in the cruise condition and low stiffness in the hover condition.
Figure 10:
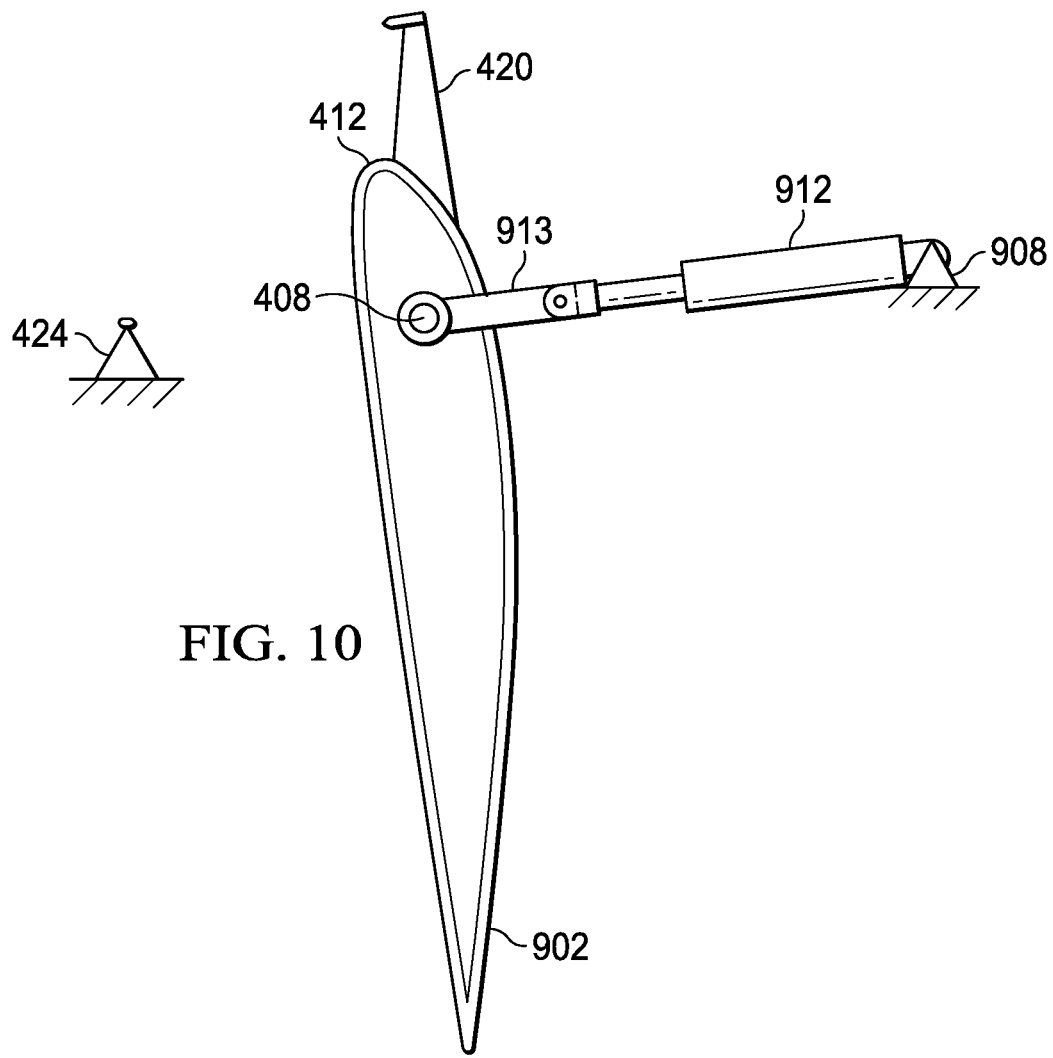

In some cases, winglet 412 may encounter turbulence and it may be desirable to provide rotational damping about the pivot 408. FIGS. 9 and 10 illustrate a damping mechanism that provides high stiffness in the cruise condition and low stiffness in the hover condition.

FIG. 9 illustrates a damper 912 connected, at one end, to pivot arm 913 and to a fixed point on the airframe 908 at the other end. The pivot arm rotates with winglet 902 about pivot 408. If the winglet attempts to weathervane in the clockwise direction from this position, the geometry of damper 912 is such that the damper incurs its maximum displacement per degree of pivot arm rotation. Thus, winglet 902 is stiff to turbulence in this position and the damper will minimize hard contact between stop contact 424 and arm extension 420.

FIG. 10 represents a hover condition, where the winglet has aligned itself (weathervaned) with the rotor down wash. In a steady state condition, the net aerodynamic forces (lift) on the winglet are zero. However, in hover, a wind gust can change the direction of the rotor downwash very rapidly. Since the winglet is free from stop contact 424, the winglet will rotate (weathervane) to stay aligned with the flow. The winglet's ability to rotate quickly helps to alleviate air loads on the winglet. Load alleviation is desirable to mitigate the forces that would otherwise be generated by the wind gust. In this (hover) condition, the damper 912 and the pivot arm 913 are in parallel or substantially parallel alignment. From a geometric standpoint the damper will achieve a minimal stroke even for a relatively large rotation of the winglet. Effectively, this geometry allows the winglet to react quickly to alleviate a gust load. By rejecting a gust force on the winglet, the helicopter is able to hold a stable hover in gusty wind conditions.

For any flight condition, the helicopter should be prepared for the possibility of an engine failure and the need for safe autorotation. Successful autorotation includes the main rotor transitioning from a power absorbing device (driven by the engine) to a power generating device similar to a wind turbine. To operate in autorotation the rotor blades develop lift force that is oriented such that the lift force is capable of propelling the rotor's rotational speed.

Figure 11:
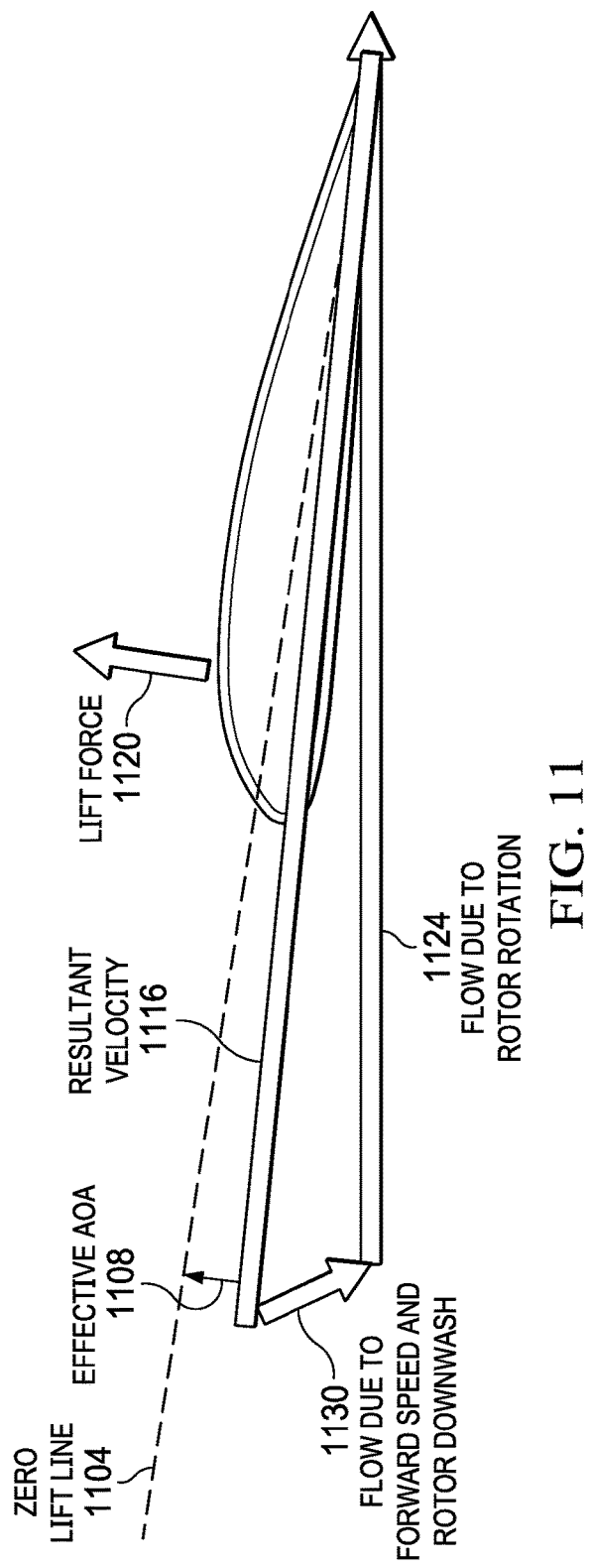
FIG. 11 illustrates a representative section of a rotor blade in normal flight.

FIG. 11 illustrates a representative section of a rotor blade in normal flight. The resultant velocity 1116 represents the net flow of air relative to the rotor blade section and is comprised of the velocity due to rotor rotation 1124 plus the speed of the helicopter through the air and the additional velocity of the rotor's downwash 1130. From an aerodynamic theory perspective, the blade's lift 1120 is determined by effective angle of attack 1108, which is the angle between the section's zero lift line 1104 and the resultant approaching velocity 1116. Furthermore, the lift vector 1120 is perpendicular to the relative wind. From here, it is understood that the lift vector 1120 is tilted rearward, relative to the rotational direction. The component of lift that opposes rotation (in addition to viscous drag (not shown)) produces the main power requirement for a helicopter in flight. By utilizing a separate winglet, as illustrated throughout this specification, the rotor lift requirement is reduced.

Figure 12:
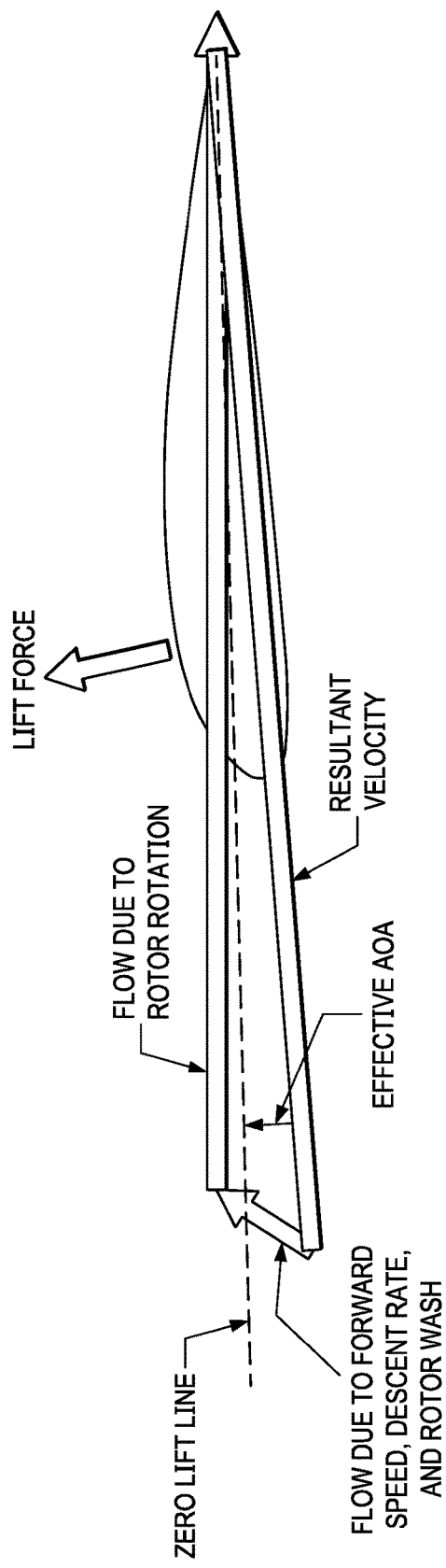
FIG. 12 illustrates a rotor blade section in an autorotation condition.

Referring now to FIG. 12, the rotor blade section is shown for an autorotation condition. By lowering the blade pitch, the pilot brings the helicopter into a steady, 1 g descent condition that has the effect of creating a net upflow through the rotor system. In general, the rotor blade section of FIG. 12 operates at the same effective angle of attack as FIG. 11, since it must produce the same net thrust in any steady flight condition. Nevertheless, the net upflow due to descent rate results in a forward tilt of the lift vector. The forward lift vector tilt in autorotation is the driving force that maintains the rotor's rotational speed for a safe landing after engine failure.

Figure 13:
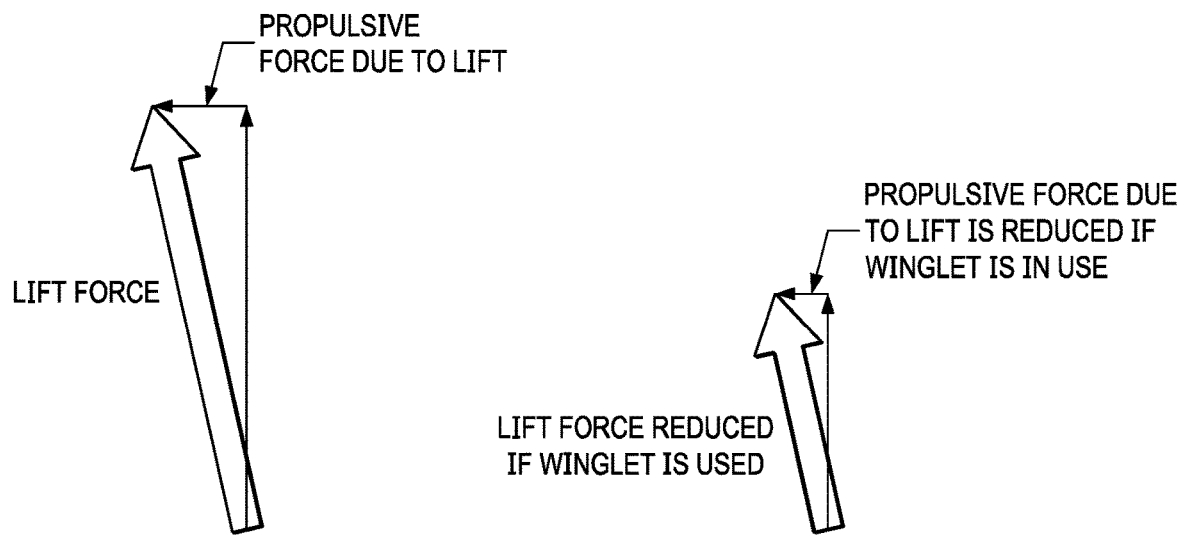
FIG. 13 illustrates the state of a lift force vector in autorotation.

The state of the lift force vector in autorotation is decomposed in FIG. 13. On the left side of FIG. 13, the propulsive component of force, shown for a section of the rotor blade, is needed to maintain the rotational speed of the rotor.

However, if the helicopter rotor is sharing its lift with a supplemental winglet, the rotor lift force will be reduced since some of the lift is carried by the winglet. In this situation the lift of the rotor blade section is represented on the right side of FIG. 13. Since the blade's lift is reduced, so is the propulsive force component used in autorotation to drive the rotor. If the propulsive force component cannot overcome the rotor drag force, the rotor's rotational speed will decrease and may result in poor autorotation characteristics.

Figure 14:
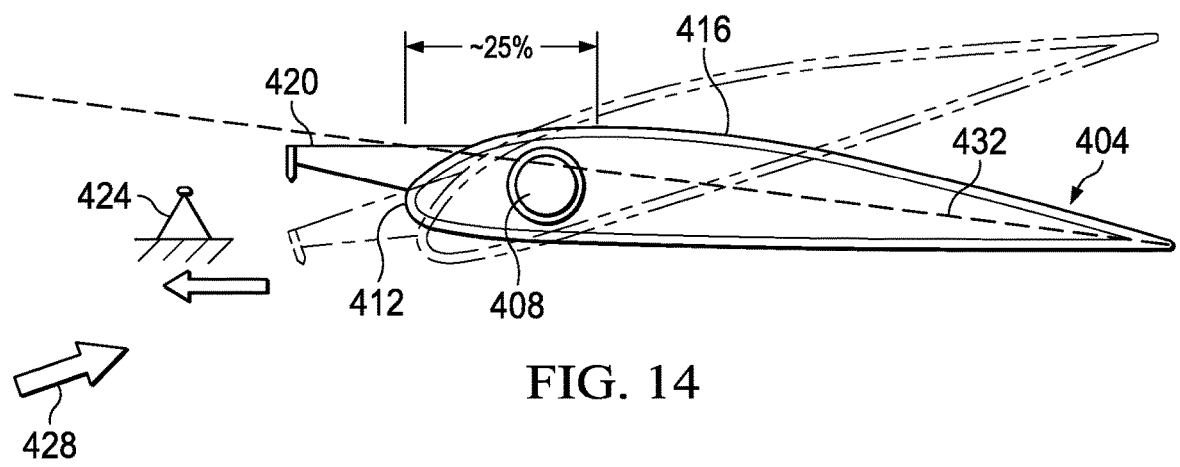
FIG. 14 illustrates retraction of a stop contact in the event of an engine failure.

To enhance the ability of a winged helicopter to autorotate, it may be beneficial to eliminate the winglet's lift. FIG. 14 shows the retraction of stop contact 424 in the event of an engine failure. The helicopter is in a descent due to engine failure as reflected by the onset flow 428. With stop contact 424 moved, the winglet is free to weathervane, thereby eliminating its lift force during the autorotative descent. With the winglet's lift eliminated the main rotor will carry the entire aircraft weight, resulting in higher rotor thrust and proportionally higher forces to sustain rotational velocity of the rotor per FIG. 13.

The diagrams in the FIGURES illustrate the architecture, functionality, and operation of possible implementations of various embodiments of the present disclosure. It should also be noted that, in some alternative implementations, the function(s) associated with particular FIGURES may occur out of the order presented. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example a rotary aircraft, comprising: a main drive rotor; an aircraft body mechanically coupled to the main drive rotor; and first and second flight assist wings passively rotatably coupled to the aircraft body.

There is further disclosed an example rotary aircraft, wherein the first and second flight assist wings are passively rotatably coupled to the aircraft body at a pivot point located forward of an aerodynamic lift vector of the flight assist wings.

There is further disclosed an example rotary aircraft, further comprising first and second fixed pylons, wherein the first and second flight assist wings are rotatably coupled to the first and second fixed pylons.

There is further disclosed an example rotary aircraft, further comprising first and second pylons, the first and second pylons rotatably coupled to the aircraft body at mount points on opposite sides of the rotary aircraft, wherein the first and second flight assist wings are statically affixed to the first and second pylons.

There is further disclosed an example rotary aircraft, wherein the first and second pylons maintain the first and second flight assist wings at a distance d from the body of the rotary aircraft, wherein the flight assist wings have a width w, and wherein d>w.

There is further disclosed an example rotary aircraft, wherein the first and second pylons maintain the first and second flight assist wings at a distance d from the body of the rotary aircraft, wherein the flight assist wings have a width w, and wherein d<w.

There is further disclosed an example rotary aircraft, wherein the first and second pylons maintain the first and second flight assist wings at a distance d from the body of the rotary aircraft, wherein the flight assist wings have a width w, and wherein d≈w.

There is further disclosed an example rotary aircraft, further comprising a downstop to set a maximum nose downward position of the flight assist wings.

There is further disclosed an example rotary aircraft, further comprising an upstop to set a maximum upward position of the flight assist wings.

There is further disclosed an example rotary aircraft, wherein the first and second flight assist wings are configured to move independently of one another.

There is further disclosed an example rotary aircraft, further comprising a unitary through rod passing through the aircraft body and through a pivot point of the first and second flight assist wings, whereby the first and second flight assist wings move jointly.

There is further disclosed an example rotary aircraft, wherein the flight assist wings are winglets statically attached to the through rod at pivot points, wherein the through rod rotatably couples to the aircraft body.

There is further disclosed an example rotary aircraft, wherein the pivot point is forward of approximately 25% of a length of the flight assist wings along a lengthwise axis of the flight assist wings.

There is further disclosed an example rotary aircraft, further comprising a damper to dampen transient rotary motion of the flight assist wings.

There is further disclosed an example rotary aircraft, further comprising independent dampers for the flight assist wings.

There is further disclosed an example rotary aircraft, further comprising biasing means to bias the flight assist wings to be vertical in the absence of rotor downwash.

There is further disclosed an example rotary aircraft, further comprising means to bias the flight assist wings to be horizontal in the absence of rotor downwash There is further disclosed an example rotary aircraft, wherein the biasing means comprise a spring and an example where the biasing means is by gravity.

There is also disclosed an example wing assembly for a rotary aircraft, comprising: a pylon having a mount point to engage a body of the rotary aircraft; and a winglet coupled to the pylon at a pivot point, wherein the winglet or pylon are configured to rotate with respect to the body of the rotary aircraft.

There is further disclosed an example wing assembly, wherein the pylon is to engage rotatably to the body of the rotary aircraft, and wherein the winglet is statically affixed to the pylon at the pivot point.

There is further disclosed an example wing assembly, wherein the pylon is to engage the body of the rotary aircraft fixedly, and wherein the winglet engages the pylon rotatably at the pivot point.

There is further disclosed an example wing assembly, wherein the pylon maintains the winglet at a distance d from the body of the rotary aircraft, wherein the winglet has a width w, and wherein d>w.

There is further disclosed an example wing assembly, further comprising a second pylon having a second mount point to engage the body of the rotary aircraft, and a second winglet coupled to the second pylon at a second pivot point.

There is further disclosed an example wing assembly, wherein the first and second pylons form a unitary through rod configured to pass through the body of the rotary aircraft and through pivot points of the winglets.

There is further disclosed an example wing assembly, wherein the winglets are statically attached to the through rod, and the through rod is configured to rotatably couple to the body of the rotary aircraft.

There is further disclosed an example wing assembly, wherein the winglets are rotatably attached to the through rod, and the through rod is configured to statically couple to the body of the rotary aircraft.

There is further disclosed an example wing assembly, wherein the winglets are configured to move independently of one another.

There is further disclosed an example wing assembly, further comprising a downstop to set a maximum nose downward position of the winglet.

There is further disclosed an example wing assembly, further comprising an upstop to set a maximum upward position of the winglet.

There is further disclosed an example wing assembly, wherein the pivot point is forward of approximately 25% of a lengthwise axis of the winglets.

There is further disclosed an example wing assembly, further comprising a damper to dampen transient rotary motion of the winglets.

There is further disclosed an example wing assembly, further comprising independent dampers for the winglets.

There is further disclosed an example wing assembly, further comprising a means to bias the winglet nose downward.

There is further disclosed an example wing assembly, wherein the biasing means comprise a spring.

There is also disclosed an example helicopter, comprising: an airframe; a main drive rotor mechanically coupled to the airframe an armament; pylons mounted to a sidewall of the airframe; and winglets coupled to the pylons, wherein the winglets are adapted to rotate relative to the sidewall of the airframe.

There is further disclosed an example helicopter, further comprising a sensor to sense airspeed or aerodynamic force on the winglet, and an active control system to actively control an angle of the winglets responsive to the sensor.

There is further disclosed an example helicopter, wherein the winglets are passively rotatably coupled to the airframe.

There is further disclosed an example helicopter, wherein the winglets are passively rotatably connected to the airframe at pivot points located forward of an aerodynamic lift vector of the winglets.

There is further disclosed an example helicopter, further comprising a downstop to set a maximum nose downward position of the winglets.

There is further disclosed an example helicopter, further comprising an upstop to set a maximum nose upward position of the winglets.

There is further disclosed an example helicopter, wherein the winglets are configured to move independently of one another.

There is further disclosed an example helicopter, wherein the pylons are statically affixed to the airframe, and the winglets are rotatably coupled to the pylons.

There is further disclosed an example helicopter, further comprising a unitary through rod passing through the airframe and through pivot points of the winglets, whereby the winglets move jointly.

There is further disclosed an example helicopter, wherein the winglets are statically attached to the through rod, and the through rod rotatably couples to the airframe.

There is further disclosed an example helicopter, wherein the winglets are coupled to the pylons at pivot points at approximately 25% of a chordwise axis of the winglet.

There is further disclosed an example helicopter, further comprising a damper to dampen transient rotary motion of the winglet.

There is further disclosed an example helicopter, further comprising independent dampers for the winglets.

There is further disclosed an example helicopter, further comprising biasing means to bias the winglets downward.

There is further disclosed an example helicopter, wherein the biasing means comprise a spring.

There is further disclosed an example helicopter, further comprising means to release the wing stop in the event of an autorotation to facilitate improved autorotation.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotary aircraft, comprising:
   a main drive rotor;
   an aircraft body mechanically coupled to the main drive rotor;
   first and second flight assist wings passively rotatably coupled to the aircraft body via first and second pylons, wherein the first and second pylons maintain the first and second flight assist wings at a distance d from the body of the rotary aircraft;
   pivot arms directly connected to the flight assist wings; and
   dampers, wherein each of the dampers comprises a first end directly connected to one of the pivot arms and a second end connected to an airframe of the rotary aircraft and wherein the dampers provide greater stiffness when the rotary aircraft is in a cruise condition than when the rotary aircraft is in a hover condition.

2. The rotary aircraft of claim 1, wherein the first and second flight assist wings are passively rotatably coupled to the aircraft body at a pivot point located forward of an aerodynamic lift vector of the flight assist wings.

3. The rotary aircraft of claim 1, wherein the first and second flight assist wings are configured to move independently of one another.

4. The rotary aircraft of claim 1, further comprising a unitary through rod passing through the aircraft body and through a pivot point of the first and second flight assist wings, whereby the first and second flight assist wings move jointly.

5. The rotary aircraft of claim 4, wherein the flight assist wings are winglets statically attached to the through rod at pivot points, wherein the through rod rotatably couples the flight assist wings to the aircraft body.

6. The rotary aircraft of claim 4, wherein the pivot point is forward of approximately 75% of a length of the flight assist wings along a chordwise axis of the flight assist wings.

7. The rotary aircraft of claim 1, wherein the dampers comprise an independent damper for each of the flight assist wings.

8. The rotary aircraft of claim 1, wherein the flight assist wings further include extension arms on leading edges thereof, the rotary aircraft further comprising stops and biasing means to bias the extension arms downward to the stops, wherein the flight assist wings are in a substantially horizontal position.

9. A wing assembly for a rotary aircraft, comprising:
   a pylon having a mount point to engage a body of the rotary aircraft; and
   a winglet coupled to the pylon at a pivot point, wherein at least one of the winglet and the pylon is configured to rotate with respect to the body of the rotary aircraft;
   a pivot arm directly connected to the winglet; and
   a damper comprising a first end directly connected to the pivot arm and a second end connected to an airframe of the rotary aircraft;
   wherein the damper provides a greater stiffness when the rotary aircraft is in a cruise condition than when the rotary aircraft is in a hover condition.

10. The wing assembly of claim 9, further comprising a second pylon having a second mount point to engage the body of the rotary aircraft, and a second winglet coupled to the second pylon at a second pivot point.

11. The wing assembly of claim 10, wherein the pylon forms a unitary through rod configured to pass through the body of the rotary aircraft and through pivot points of the winglet.

12. A helicopter, comprising:
   an airframe;
   a main drive rotor mechanically coupled to the airframe;
   pylons mounted to a sidewall of the airframe; and
   winglets coupled to the pylons, wherein the winglets are adapted to rotate relative to the sidewall of the airframe;
   pivot arms directly connected to the winglets; and
   dampers, wherein each of the dampers comprises a first end directly connected to one of the pivot arms and a second end connected to the airframe of the rotary aircraft and wherein the dampers provide greater stiffness when the rotary aircraft is in a cruise condition than when the rotary aircraft is in a hover condition.

13. The helicopter of claim 12, further comprising a sensor to sense airspeed or aerodynamic force on the winglets, and an active control system to actively control an angle of the winglets responsive to the sensor.

14. The helicopter of claim 12, wherein the winglets are passively rotatably coupled to the airframe.

15. The helicopter of claim 12, wherein the dampers dampen transient rotary motion of the winglets.

16. The helicopter of claim 12, further comprising biasing means to bias the winglets to a vertical or substantially vertical position in the event of an autorotation.

17. The helicopter of claim 12, further comprising a means to release the winglets from a lifting angle of attack position during autorotation.

18. The rotary aircraft of claim 1, wherein the first and second pylons are formed of a single rod.

19. The rotary aircraft of claim 1, wherein the first and second pylons are independent of one another.

20. The rotary aircraft of claim 1, wherein the flight assist wings have a width w, and wherein d>w.

\* \* \* \* \*